United States Patent [19]
Elias et al.
[11] 3,731,138
[45] May 1, 1973

[54] SIGNAL GENERATING CIRCUIT FOR A DEFLECTION SYSTEM

[75] Inventors: William Elias, Batavia; Valdes Silverio Antonio, Alexander; George Cleveland Waybright, Oakfield, all of N.Y.

[73] Assignee: GTE Sylvania Incorporated, Seneca Falls, N.Y.

[22] Filed: Aug. 26, 1971

[21] Appl. No.: 175,159

[52] U.S. Cl. ....................315/29, 315/27 TD
[51] Int. Cl. ....................H01j 29/70
[58] Field of Search ....................315/27 TD, 27 GG, 315/29

[56] References Cited

UNITED STATES PATENTS

| | | | |
|---|---|---|---|
| 3,155,873 | 11/1964 | Paschal | 315/27 R |
| 3,435,282 | 3/1969 | Barchok | 315/27 TD |
| 3,441,791 | 4/1969 | Beck | 315/27 GD |
| 3,543,080 | 11/1970 | Wuensch | 315/24 X |
| 3,543,081 | 11/1970 | Vitek | 315/29 |

FOREIGN PATENTS OR APPLICATIONS

| | | | |
|---|---|---|---|
| 693,697 | 9/1964 | Canada | 315/27 TD |

*Primary Examiner*—Leland A. Sebastian
*Attorney*—Norman J. O'Malley et al.

[57] ABSTRACT

A signal generating circuit for generating a signal of a predetermined waveform for application to a deflection winding of a deflection yoke associated with a cathode ray tube is disclosed. The signal generating circuit includes a linearity or branch circuit for varying the charging rate of a capacitor which wave shapes the voltage across the capacitor.

13 Claims, 6 Drawing Figures

INVENTORS
WILLIAM ELIAS,
SILVERIO A. VALDES, &
GEORGE C. WAYBRIGHT

BY
Robert E. Walrath
ATTORNEY

INVENTORS
WILLIAM ELIAS,
SILVERIO A. VALDES, &
GEORGE C. WAYBRIGHT

BY Robert E. Walrath
ATTORNEY

SIGNAL GENERATING CIRCUIT FOR A DEFLECTION SYSTEM

BACKGROUND OF THE INVENTION

This invention relates to deflection circuitry and more specifically to signal generating circuitry for generating a signal with a predetermined waveform suitable for application to a deflection winding associated with a cathode ray tube. Prior art apparatus typically utilizes transformers to couple deflection signals to deflection windings to a yoke for deflecting the electron beam or beams of a cathode ray tube. The deflection signal typically is generated by an oscillator circuit such as a multivibrator. The transformer is designed to properly wave shape the signal provided by an output stage of the oscillator or coupled to the oscillator to provide a suitable deflection voltage to the deflection winding. The transformer in such prior art apparatus is generally undesirable because it is large, bulky, and expensive. Furthermore, it tends to radiate signals which disturb other electrical apparatus.

Attempts to eliminate the transformer, however, have often resulted in deflection systems with less than desirable performance or cost factors. One particular problem has been nonlinearity of the deflection of the electron beam whereby the trace on one portion of the screen is compressed with respect to another portion of the screen. Attempts to utilize feedback from the yoke, special wave-shaping circuitry, etc. to improve linearity have often provided less than desirable performance or severe cost penalties.

OBJECTS AND SUMMARY OF THE INVENTION

It is an object of this invention to provide an improved deflection system that obviates the above-noted disadvantages of the prior art.

It is a further object to provide an improved transformer-less deflection system.

It is a still further object to provide improved signal generating circuitry for an open loop deflection system.

These and other objects and advantages are achieved in one aspect of this invention in a deflection system for a cathode ray tube including a deflection yoke having a deflection winding associated with the cathode ray tube. A signal generating circuit is coupled by an amplifier or driver to the deflection winding. The signal generating circuit includes a capacitor coupled to the amplifier or driver with a charging circuit including a current generating means connected to the capacitor. The charging circuit charges the capacitor to provide a substantially linearly increasing voltage. Means connected to the capacitor periodically discharges the capacitor. A branch or linearity circuit is connected to the charging circuit for varying the charging current to provide a voltage or deflection signal of predetermined waveform.

DETAILED DESCRIPTION OF THE INVENTION

For a better understanding of the present invention, together with other and further objects, advantages, and capabilities thereof, reference is made to the following disclosure and appended claims in connection with the above-described drawings.

The invention will be described with respect to a vertical deflection or scanning system of a television receiver, however, other uses as well as other embodiments of the invention will be evident to those skilled in the art.

Figure 1:
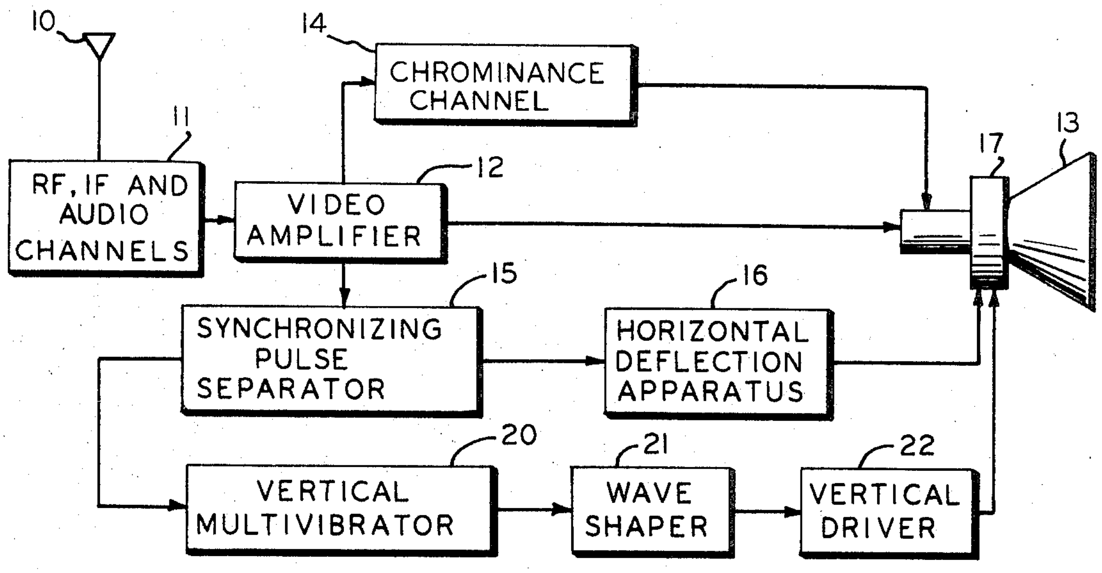
FIG. 1 is a block diagram of a television receiver utilizing an embodiment of the invention.

In FIG. 1 an antenna 10 for intercepting transmitted television signals is connected to a block 11 which includes radio frequency (RF), intermediate frequency (IF), and audio channels typically utilized in the signal receiver of television receivers. An output of the video or IF detector of the IF channel is connected via a video amplifier 12 to a cathode ray tube (CRT) display device 13. If the invention is utilized in a color television receiver, the signal receiver also includes a chrominance channel 14 connected between video amplifier 12 and CRT 13.

A synchronizing pulse separator 15 is connected to the signal receiver, for example, to an output of video amplifier 12. Synchronizing pulse separator 15 receives the composite video signal and separates the vertical and horizontal synchronizing pulses therefrom. Synchronizing pulse separator 15 has a first output connected to horizontal deflection apparatus 16 which has an output connected to a deflection yoke 17. Deflection yoke 17 has horizontal and vertical deflection windings associated with CRT 13 for causing electron beam scanning of the screen of CRT 13 in the horizontal and vertical directions, respectively.

Another output of synchronizing pulse separator 15 is connected to a deflection system such as the vertical deflection system of the television receiver. The vertical deflection system includes an oscillator such as vertical multivibrator 20 connected to the output of synchronizing pulse separator 15. An output of multivibrator 20 is connected to a wave shaping circuit such as wave shaper 21. An output of wave shaper 21 is connected to an amplifier or driver such as vertical driver 22 which is connected to a deflection winding such as the vertical deflection winding of yoke 17. The deflection signal generating circuit including vertical multivibrator 20, wave shaper 21, and vertical driver 22 are described in greater detail in FIG. 2.

Figure 2:
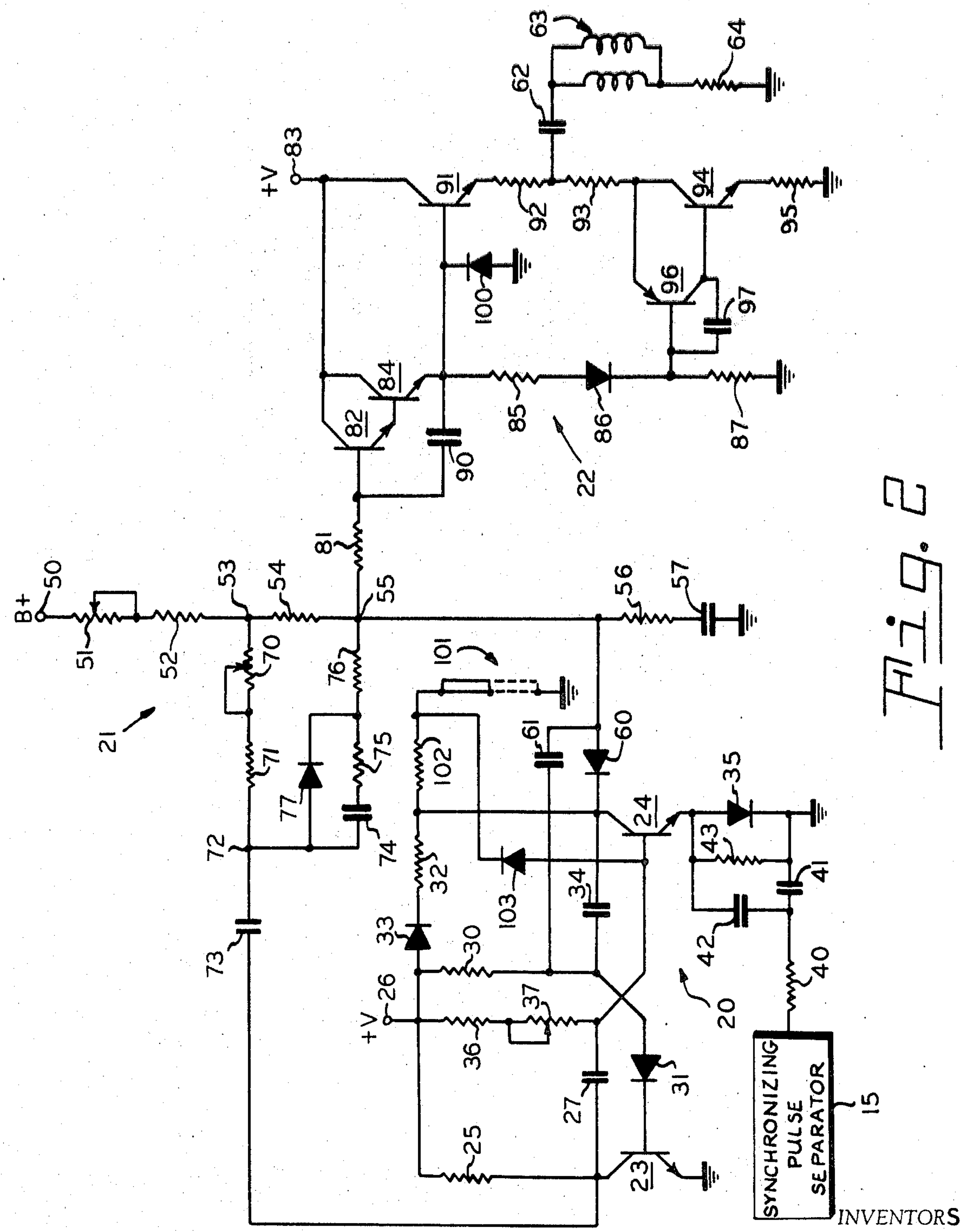
FIG. 2 is a schematic diagram of a portion of FIG. 1 illustrating one embodiment of the invention.

Referring to FIG. 2, multivibrator 20 includes first and second transistors 23 and 24. An output electrode or collector of transistor 23 is connected by a resistor 25 to a positive potential source illustrated as a terminal 26 and by a capacitor 27 to the base of transistor 24. The emitter of transistor 23 is connected to a common conductor illustrated as ground. A resistor 30 is connected in series with a diode 31 between source 26 and the base of transistor 23.

An output electrode such as the collector of transistor 24 is connected by a resistor 32 in series with a reverse poled diode 33 to source 26 and by a capacitor 34 to the junction between resistor 30 and diode 31. The emitter of transistor 24 is connected by a diode 35 to ground. A resistor 36 in series with a variable resistance such as potentiometer 37, is connected between source 26 and the base of transistor 24.

The output of synchronizing pulse separator 15 is connected by a resistor 40 in series with a capacitor 41 to ground. A coupling capacitor 42 is connected between the emitter of transistor 24 and the junction of resistor 40 and capacitor 41. A resistor 43 is connected between the emitter of transistor 24 and ground.

In operation, multivibrator 20 determines the trace and retrace intervals of the field (vertical) scanning of the CRT. During trace, transistor 24 is in a non-conducting state of OFF and transistor 23 is in a conducting state or ON. Current flow from source 26 through resistor 30 and diode 31 to the base of transistor 23 keeps transistor 23 conducting in saturation. Since transistor 24 is OFF, its collector voltage is high and current flow from source 26 through diode 33, resistor 32, capacitor 34, diode 31, and transistor 23 charges capacitor 34. A charging current also flows from source 26 through resistor 36, potentiometer 37, capacitor 27, and transistor 23 to charge capacitor 27 until the base voltage of transistor 24 rises sufficiently to turn transistor 24 ON. When transistor 24 switches ON, its collector voltage drops and capacitor 34 reverse biases the base of transistor 23 thereby turning transistor 23 OFF and ending the trace interval. The charging time constant of capacitor 27 determines the time of the trace interval which is variable by potentiometer 37. Thus, potentiometer 37 serves as a hold control. The time constant of resistor 32 and capacitor 34 is preferably short compared to the time constant of resistor 36, potentiometer 37, and capacitor 27 so that capacitor 34 becomes fully charged during the trace interval.

When transistor 24 turns ON, the trace interval starts. Current flow from source 26 through resistor 36 and potentiometer 37 to the base of transistor 24 holds transistor 24 ON. Since the collector voltage of transistor 24 is low (near ground) current flows from source 26 through resistor 30, capacitor 34, transistor 24, and diode 35 to charge capacitor 34 until the base voltage of transistor 23 rises sufficiently to turn transistor 23 ON. Thus, the time constant of resistor 30 and capacitor 34 determines the time of the retrace interval. During retrace, capacitor 27 charges through resistor 25, transistor 24, and diode 35. The time constant of resistor 35 and capacitor 27 is preferably short compared to the time constant of resistor 30 and capacitor 34 so that capacitor 27 becomes fully charged during the retrace interval. When transistor 23 switches ON, its collector voltage drops and capacitor 27 reverse biases the base of transistor 24 to turn transistor 24 OFF thereby starting the next trace interval. Diodes 31 and 35 prevent reverse emitter-base breakdown of transistors 23 and 24, respectively.

Synchronizing pulse separator 15 provides negative-going separated synchronizing pulses which are integrated by resistor 40 and capacitor 41. The time constant of resistor 40 and capacitor 41 is sufficiently long so that horizontal synchronizing pulses and noise pulses which may be present at the output of separator 15 do not develop a significant voltage across capacitor 41. Vertical synchronizing pulses, however, do cause significant negative voltage pulses to occur across capacitor 41 which are coupled via capacitor 42 to the emitter of transistor 24. The vertical synchronizing pulses reverse bias diode 35 and trigger multivibrator 20 by turning transistor 24 ON thereby synchronizing multivibrator 20 with the received signal.

Wave shaper 21 includes a positive potential source illustrated as a terminal 50 connected by a variable resistive means illustrated as a potentiometer 51 in series with a resistor 52 to a junction 53. Junction 53 is connected by a resistor 54 to a junction 55 which is further connected by a resistor 56 in series with a capacitor 57 to ground, thereby establishing a charging circuit for capacitor 57. Source 50 together with a variable resistive means comprising potentiometer 51 and resistor 52 comprise a current generating means for providing a substantially constant current to charge capacitor 57. Accordingly, the resistance of potentiometer 51 and resistor 52 is preferably substantially greater than the resistances of resistors 54 and 56. Junction 55 is further connected by a diode 60 to the collector of transistor 24, by a capacitor 61 to the junction between capacitor 34 and diode 31, and to the input of driver 22. Capacitor 61 provides feedback to multivibrator 20 to compensate for line voltage variations.

The output of driver 22 is connected via a coupling capacitor 62 to one end of vertical deflection winding 63, the other end of which is connected by a compensation resistor such as thermistor 64 to ground. Thermistor 64 provides temperature compensation for winding 63 in the usual manner. Winding 63 is illustrated as being a split winding or two windings connected in parallel, however, series connected windings or other configurations will also be evident to those skilled in the art.

Figure 3:
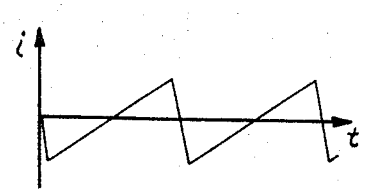
FIGS. 3, 4, 5, and 6 are waveform diagrams to aid in explaining the invention.
Figure 4:
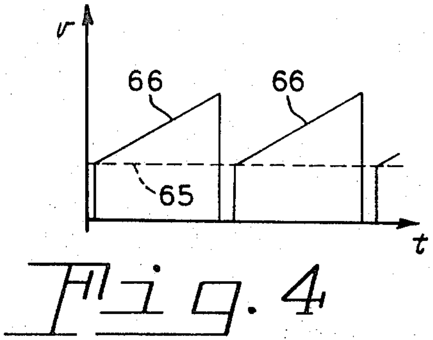

The sawtooth waveform of the desired deflection current applied to winding 63 is illustrated in FIG. 3. Since winding 63 has a resistance associated with it, as well as inductance, a sawtooth voltage is required to provide a sawtooth current to winding 63. This sawtooth voltage is provided at junction 55 by the voltage across capacitor 57. During the trace interval, transistor 24 is OFF and its collector voltage is high, thereby reverse biasing diode 60. The initial voltage at junction 55, illustrated by level 65 in FIG. 4, is established by the voltage across resistor 56 and capacitor 57. Current flows from source 50 through the resistor chain 51, 52, 54, and 56 to charge capacitor 57. To obtain a substantially linearly increasing voltage at junction 55, illustrated by ramps 66 in FIG. 4, the charging time constant of capacitor 57 is preferably long relative to the trace interval. The slope and hence the maximum amplitude of ramps 66 can be varied by varying the resistance of potentiometer 51 which thereby varies the constant current provided for charging capacitor 57. Thus, potentiometer 51 serves as a height control.

At the end of the trace interval, transistor 24 switches ON and its collector voltage drops to near ground potential, thereby lowering the voltage at junction 55 to near ground. Capacitor 57 discharges through resistor 56, diode 60, transistor 24, and diode 35 during the retrace interval. Thus, multivibrator 20 includes means for periodically discharging capacitor 57. Diode 33 suppresses any transient positive pulses that may appear at the collector of transistor 24 during switching and prevents current flow from junction 55 to source 26.

While a substantially linearily increasing voltage at junction 55 is provided by capacitor 57 during trace intervals, there are various nonlinearities that distort the current through winding 63 or otherwise cause nonlinearities of the scanning of the CRT. For example, the resistance of winding 63, which has already been noted, affects the linearity of the scan. Also coupling capacitor 62 has a deleterious effect unless it is extremely large (on the order of 15,000 microfarads or larger). It is highly desirable to avoid such large and expensive capacitors. To this end, and to provide linear scanning of the CRT, a linearity compensation circuit is provided in wave shaper 21 in the form of a branch circuit connected to the charging circuit for capacitor 57 to vary the charging current for capacitor 57 by diverting a portion of it away from capacitor 57.

The linearity or branch circuit includes a resistive means comprising a variable resistor illustrated as a potentiometer 70 connected in series with a resistor 71 between junction 53 and a junction 72. Junction 72 is connected by a capacitor 73 to the collector of transistor 23. Junction 72 is further connected by a capacitor 74 in series with resistors 75 and 76 to junction 55. A diode 77 is connected in parallel with capacitor 74 and resistor 75.

Figure 5:
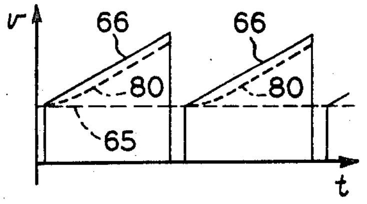

During trace, transistor 23 is ON and its collector voltage is near ground. Current flows from junction 53 through potentiometer 70, resistor 71, capacitor 73, and transistor 23 to charge capacitor 73. Preferably, the charging time constant of capacitor 73 is short relative to the trace interval and the charging time constant of capacitor 57. The effect of the current path including capacitor 73 is illustrated in FIG. 5. The dashed lines 80 illustrate the decrease or deviation from voltage waveform 66 at junction 55 due to the current diverted through capacitor 73. This diversion of current from the charging circuit decreases the charging rate of capacitor 57 initially, but as capacitor 73 becomes charged lines 80 become nearly parallel to lines 66.

Figure 6:
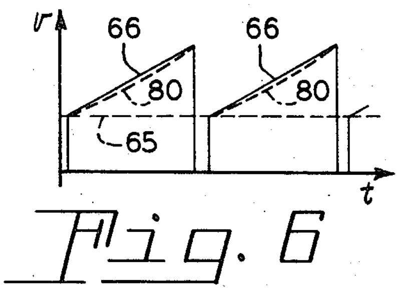

The current path, including capacitor 74 and resistors 75 and 76, provides further wave shaping. As capacitor 73 charges, an increasing amount of current flows through capacitor 74 and resistors 75 and 76 back to the charging circuit at junction 55. This current further modifies the charging of capacitor 57 by smoothing lines 80 of the waveform of the signal at junction 55. When capacitor 74 becomes sufficiently charged, diode 77 conducts so that additional "-smoothing" is provided. The effect of the additional current path is illustrated in FIG. 6 wherein dashed lines 80 represent the total modification of the voltage waveform at junction 55. Preferably, the time constant for charging capacitor 74 is longer than the time constant for charging capacitor 73. These time constants can be varied by potentiometer 70 to provide the desired wave shape or linearity control. Thus, potentiometer 70 serves as a linearity control.

During retrace, transistor 23 switches OFF and current flow through resistor 25, diode 77, resistor 76, diode 60, transistor 24, and diode 35 discharges capacitor 73. Alternatively, a switching means other than one of the multivibrator transistors could be used for discharging capacitor 73 during retrace.

Driver 22 includes a resistor 81 connected between junction 55 and a base of a transistor 82 which has a collector connected to a positive potential source illustrated as a terminal 83. An emitter of transistor 82 is connected to a base of a transistor 84, a collector of which is connected to source 83. Transistors 82 and 84 are a Darlington connected emitter follower. An emitter of transistor 84 is connected by a resistor 85 in series with a diode 86 and a resistor 87 to ground and by a capacitor 90 to the base of transistor 82. Capacitor 90 provides feedback to reject video signals that may be picked up by radiation. The emitter of transistor 84 is further connected to a base of a transistor 91 which has a collector connected to source 83 and an emitter connected by a resistor 92 in series with a resistor 93 to a collector of a transistor 94. The junction between resistors 92 and 93 is connected to capacitor 62 and serves as the output of driver 22. An emitter of transistor 94 is connected by a resistor 95 to ground. The junction between diode 86 and resistor 87 is connected to a base of a transistor 96 which has a collector connected to a base of transistor 94 and an emitter connected to the collector of transistor 94. A feedback capacitor 97 is connected from the collector to the base of transistor 96 to prevent oscillation thereof. A diode 100 is connected between ground and the base of transistor 91 to suppress ringing pulses during retrace that may be fed back through transistor 91.

The signal voltage across capacitor 57, represented by the waveform of FIG. 6, is coupled from junction 55 via transistors 82 and 84 to the bases of transistors 91 and 96. At the end of each retrace the electron beam in CRT 13 is scanning at the top of the screen. During the first half of the trace, the electron beam is deflected from the top to the central portion of the screen. When the electron beam reaches the central portion of the screen, the current through winding 63 reverses direction to deflect the electron beam from the central portion to the bottom of the screen.

When the electron beam is at the central portion of the screen of CRT 13, transistor 91 starts conducting due to the bias across resistors 85 and 87 and diode 86. Due to the increasing voltage at the emitter of transistor 84, a substantially linearly increasing current flows from source 83 through transistor 91, resistor 92, capacitor 62, winding 63, and thermistor 64 to charge capacitor 62 and deflect the electron beam from the central portion to the bottom of the screen. At the end of the trace, capacitor 62 is charged, for example, to approximately one-half the voltage of source 83. Also, during this portion of the trace, transistor 96, and hence transistor 94, is cut-off.

When the retrace interval starts, the voltages at junction 55 and the emitter of transistor 84 rapidly decrease to cut-off transistor 91. Transistor 96, and hence transistor 94, begin conducting due to the bias developed across resistor 87 to reverse the current through winding 63 thereby causing the electron beam to retrace to the top of the screen of CRT 13.

The voltage at the emitter of transistor 84 at the start of the trace interval causes a bias voltage to be developed across resistor 87 to bias transistors 96 and 94 so that current flows from winding 63 through capacitor 62, resistor 93, transistor 94, resistor 95, and thermistor 64. This current decreases in magnitude substantially linearly due to the increasing voltage at the emitter of transistor 84 thereby deflecting the electron beam in CRT 13 from the top to the central portion of the screen and discharging capacitor 62. When the electron beam reaches the central portion of the screen, the voltage at the emitter of transistor 84 causes transistor 91 to start conducting again to scan the bottom portion of the screen as was described above.

In driver 22 transistors 82 and 84 are used to provide a high input impedance so that multivibrator 20 is not loaded and the charging of capacitor 57 is not affected. Diode 86 provides an offset voltage between the bases of transistors 91 and 96. Transistor 96 provides phase inversion while resistors 92 and 93 provide localized feedback.

In color television receivers it is usually desired to include a means to prevent vertical scanning to aid in adjusting the electron beams. Accordingly, a service-normal switch 101 is provided for this function. One end of switch 101 is connected to ground and the other end is connected via a resistor 102 to the collector of transistor 24. A diode 103 is connected between the base of transistor 24 and the junction of resistor 102 and switch 101.

During normal operation switch 101 is disconnected from ground. Diode 103 is reverse biased and the circuit operates as described above. When switch 101 connects resistor 102 and diode 103 to ground, however, diode 103 becomes forward biased, thereby preventing multivibrator 20 from oscillating. Resistor 102 is provided to maintain a nominal bias at the collector of transistor 24. Thus, capacitor 57 is allowed to charge until diode 60 becomes forward biased. The voltage across capacitor 57 is coupled via driver 22 to maintain a nominal charge on capacitor 62 during the time switch 101 is in the service position.

Thus, there has been described a novel signal generating circuit for a deflection system. A deflection system utilizing the invention exhibits numerous advantages not found in prior art deflection systems.

While there has been shown and described what is at present considered the preferred embodiment of the invention, it will be obvious to those skilled in the art that various changes and modifications may be made therein without departing from the scope of the invention as defined by the appended claims.

We claim as our invention:

1. In a deflection system for a cathode ray tube including a deflection yoke having a deflection winding therein associated with said cathode ray tube and an amplifier connected to said deflection winding, a signal generating circuit comprising: a first capacitor coupled to an input of said amplifier;

a charging circuit including current generating means connected to said first capacitor for charging said first capacitor to provide a substantially linearly increasing voltage thereacross;

means connected to said charging circuit for periodically discharging said first capacitor; and a branch circuit, having a current path including a resistive means and a second capacitor, connected to said charging circuit for varying the charging rate of said first capacitor by diverting a portion of the current from said current generating means through said second capacitor for producing a signal with a predetermined waveform at the input of said amplifier.

2. A signal generating circuit as defined in claim 1 wherein said branch circuit includes a second current path including means connected between said second capacitor and said resistive means and said charging circuit for diverting current from said firs-mentioned current path to said charging circuit.

3. A signal generating circuit as defined in claim 2 wherein said second current path has a time constant longer than the time constant of said first-mentioned current path.

4. A signal generating circuit as defined in claim 2 wherein said resistive means includes a variable component for varying the time constant of said first-mentioned current path.

5. A signal generating circuit as defined in claim 1 wherein said current generating means includes a potential source and a resistive means for supplying a substantially constant current.

6. A signal generating circuit as defined in claim 1, wherein said means for periodically discharging said first capacitor includes an oscillator having a frequency of oscillation equal to a scanning rate of said cathode ray tube.

7. In a television receiver including a cathode ray tube, a deflection yoke having a deflection winding associated with said cathode ray tube, a signal receiver connected to said cathode ray tube, and a synchronizing pulse separator connected to said signal receiver, a deflection signal generating circuit comprising:

a first capacitor;

a charging circuit including a current generating means connected to said first capacitor for charging said first capacitor in response to a current from said current generating means to provide a substantially linearly increasing voltage thereacross;

driver means coupled between said first capacitor and said deflection winding for energizing said deflection winding in accordance with the voltage across said first capacitor;

means connected to said synchronizing pulse separator and said first capacitor for periodically discharging said first capacitor in synchronism with synchronizing pulses from said synchronizing pulse separator; and a linearity circuit including a current path including resistive means and a second capacitor series connected to said charging circuit for diverting current from said current generating means by charging said second capacitor to provide a voltage of predetermined waveform across said first capacitor.

8. A deflection signal generating circuit as defined in claim 7 wherein said means for periodically discharging said first capacitor includes an oscillator synchronized with synchronizing pulses from said synchronizing pulse separator.

9. A deflection signal generating circuit as defined in claim 8 wherein said oscillator is a multivibrator having first and second transistors, said first transistor being connected to said first capacitor for discharging said first capacitor when said first transistor is in a conducting state.

10. A deflection signal generating circuit as defined in claim 7 wherein said linearity circuit includes means for providing a second current path connected intermediate said first-mentioned current path and said charging circuit for returning to said charging circuit a portion of the current diverted by said first-mentioned current path determined by the charge on said second capacitor.

11. A deflection signal generating circuit as defined in claim 10 wherein said resistive means includes a variable resistor for varying the charging time constant of said second capacitor, the charging time constant of said second capacitor being short with respect to the charging time constant of said first capacitor, and said means for providing a second current path includes a third capacitor having a charging time constant longer than the charging time constant of said second capacitor.

12. A deflection signal generating circuit as defined in claim 7 wherein said means for periodically discharging said first capacitor includes a multivibrator having first and second transistors, said first transistor being connected to said first capacitor and said second transistor being connected to said second capacitor for discharging said first and second capacitors during retrace intervals.

13. A deflection signal generating circuit as defined in claim 7 wherein said current generating means includes a potential source and variable resistive means for providing a substantially constant charging current to said first capacitor, said charging current being variable by said variable resistance means.

* * * * *